US012561872B2

(12) United States Patent
Zhang et al.

(10) Patent No.: US 12,561,872 B2
(45) Date of Patent: Feb. 24, 2026

(54) METHOD OF TRAINING IMAGE DECOMPOSITION MODEL, METHOD OF DECOMPOSING IMAGE, ELECTRONIC DEVICE, AND STORAGE MEDIUM

(71) Applicant: NUCTECH COMPANY LIMITED, Beijing (CN)

(72) Inventors: Li Zhang, Beijing (CN); Yunda Sun, Beijing (CN); Zheng Hu, Beijing (CN); Gang Fu, Beijing (CN); Qiang Li, Beijing (CN)

(73) Assignee: NUCTECH COMPANY LIMITED, Haidian District (CN)

( * ) Notice: Subject to any disclaimer, the term of this patent is extended or adjusted under 35 U.S.C. 154(b) by 318 days.

(21) Appl. No.: 18/225,060

(22) Filed: Jul. 21, 2023

(65) Prior Publication Data

US 2024/0037816 A1     Feb. 1, 2024

(30) Foreign Application Priority Data

Jul. 22, 2022    (CN) .......................... 202210874253.6

(51) Int. Cl.
*G06T 11/00*        (2006.01)
*G06T 5/50*        (2006.01)

(52) U.S. Cl.
CPC .............. *G06T 11/006* (2013.01); *G06T 5/50* (2013.01); *G06T 2207/20081* (2013.01); *G06T 2207/20084* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 2019/0251401 A1 | 8/2019 | Shechtman et al. | |
| 2020/0151938 A1* | 5/2020 | Shechtman | G06N 3/045 |
| 2020/0349391 A1* | 11/2020 | Zhang | G06F 18/2148 |
| 2020/0394459 A1* | 12/2020 | Xu | G06N 3/045 |

(Continued)

OTHER PUBLICATIONS

Extended European Search Report dated Jan. 16, 2024 for corresponding European patent application No. EP23187083.3 (12 pages).

(Continued)

*Primary Examiner* — Jiangeng Sun
(74) *Attorney, Agent, or Firm* — Merchant & Gould P.C.

(57) ABSTRACT

A method of training an image decomposition model, a method of decomposing an image, an electronic device, and a storage medium are provided. The method of training the image decomposition model includes: acquiring a training set; inputting first and second training images into first and second adversarial neural networks respectively, so as to determine a first loss function value; inputting a third training image into the first and second adversarial neural networks respectively, so as to determine a second loss function value; determining a third loss function value according to a comparison result between an acquired fusion image and the third training image, where the fusion image is generated by fusing generated images of the first and second adversarial neural networks, and adjusting a parameter of the image decomposition model according to at least one of the first to third loss function values.

14 Claims, 12 Drawing Sheets

(56)                References Cited

U.S. PATENT DOCUMENTS

| 2021/0055719 A1* | 2/2021 | Zheng | G05B 23/0283 |
|---|---|---|---|
| 2023/0154165 A1* | 5/2023 | Park | G06V 10/82 |
| | | | 382/128 |
| 2023/0162530 A1* | 5/2023 | Singh | G06F 18/217 |
| | | | 382/118 |
| 2024/0135721 A1* | 4/2024 | Ambrus | G06V 20/58 |
| 2024/0369977 A1* | 11/2024 | Mohta | G06N 3/0464 |

OTHER PUBLICATIONS

Thammasorn Phawis, et al "Augmenting data with GANs for Firearms Detection in Cargo X-ray Images", Proc. of SPIE, 2022, vol. 12104, pp. 1210406-1-10, XP060160387.

Laura Graesser, et al, "Composable Unpaired Image to Image Translation", Arxiv. Org. Cornell University Library, 2018, XP080871018, 9 pages.

Cui Yunqi, et al, "Automated Firearms Detection in Cargo X-ray Images using RetinaNet", Proc. of SPIE, 2019, vol. 10999, pp. 109990P1-11, XP060121934.

Victoria Cutler, et al, "Use of Threat Image Projection (TIP) to enhance security performance", Security Technology, 2009, 43rd Annual 2009 International Carnahan Conference on, IEEE, Piscataway, NJ, USA, pp. 46-51, XP031568214.

Phillip Isola, et al, "Image-to-Image Translation with Conditional Adversarial Networks", Arxiv. Org., Cornell University Library, 2016, XP081350279, pp. 1-17.

* cited by examiner

100

101

104

103

102

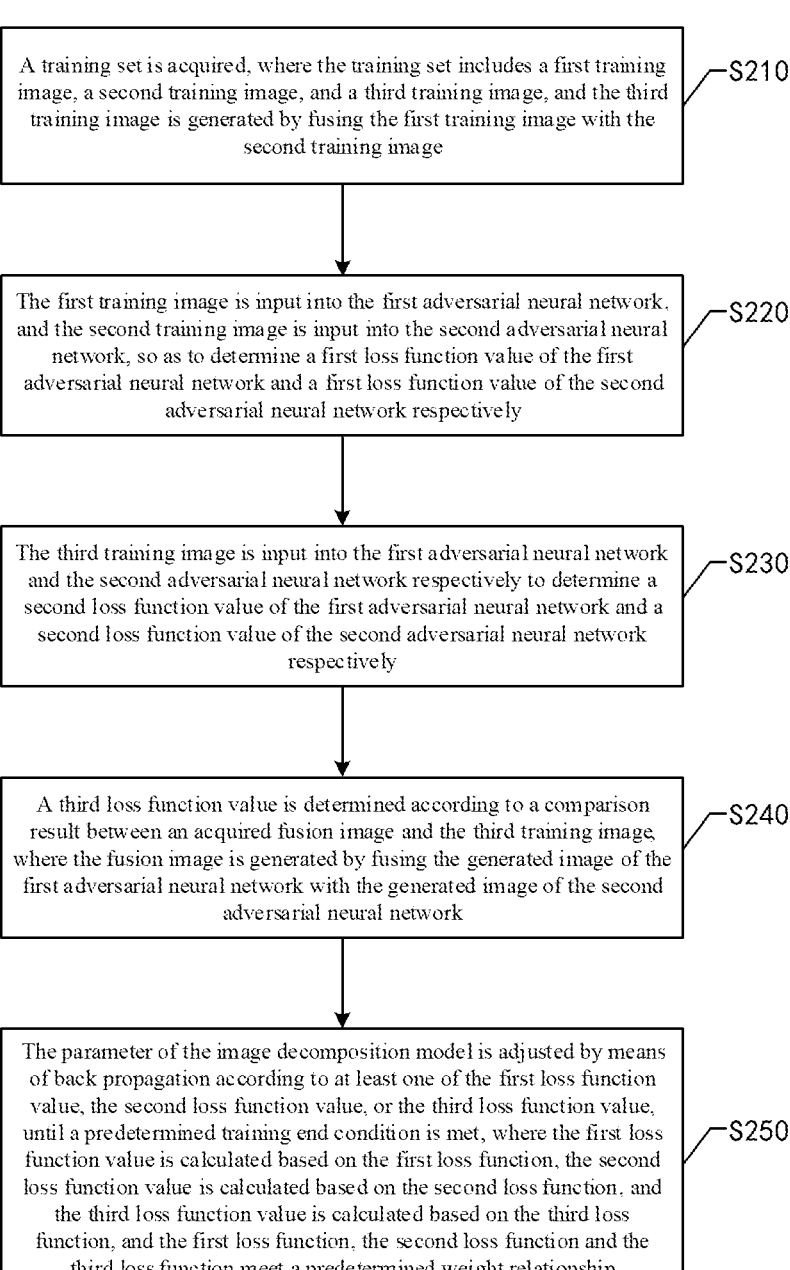

200

A training set is acquired, where the training set includes a first training image, a second training image, and a third training image, and the third training image is generated by fusing the first training image with the second training image ⟋—S210

The first training image is input into the first adversarial neural network, and the second training image is input into the second adversarial neural network, so as to determine a first loss function value of the first adversarial neural network and a first loss function value of the second adversarial neural network respectively ⟋—S220

The third training image is input into the first adversarial neural network and the second adversarial neural network respectively to determine a second loss function value of the first adversarial neural network and a second loss function value of the second adversarial neural network respectively ⟋—S230

A third loss function value is determined according to a comparison result between an acquired fusion image and the third training image, where the fusion image is generated by fusing the generated image of the first adversarial neural network with the generated image of the second adversarial neural network ⟋—S240

The parameter of the image decomposition model is adjusted by means of back propagation according to at least one of the first loss function value, the second loss function value, or the third loss function value, until a predetermined training end condition is met, where the first loss function value is calculated based on the first loss function, the second loss function value is calculated based on the second loss function, and the third loss function value is calculated based on the third loss function, and the first loss function, the second loss function and the third loss function meet a predetermined weight relationship ⟋—S250

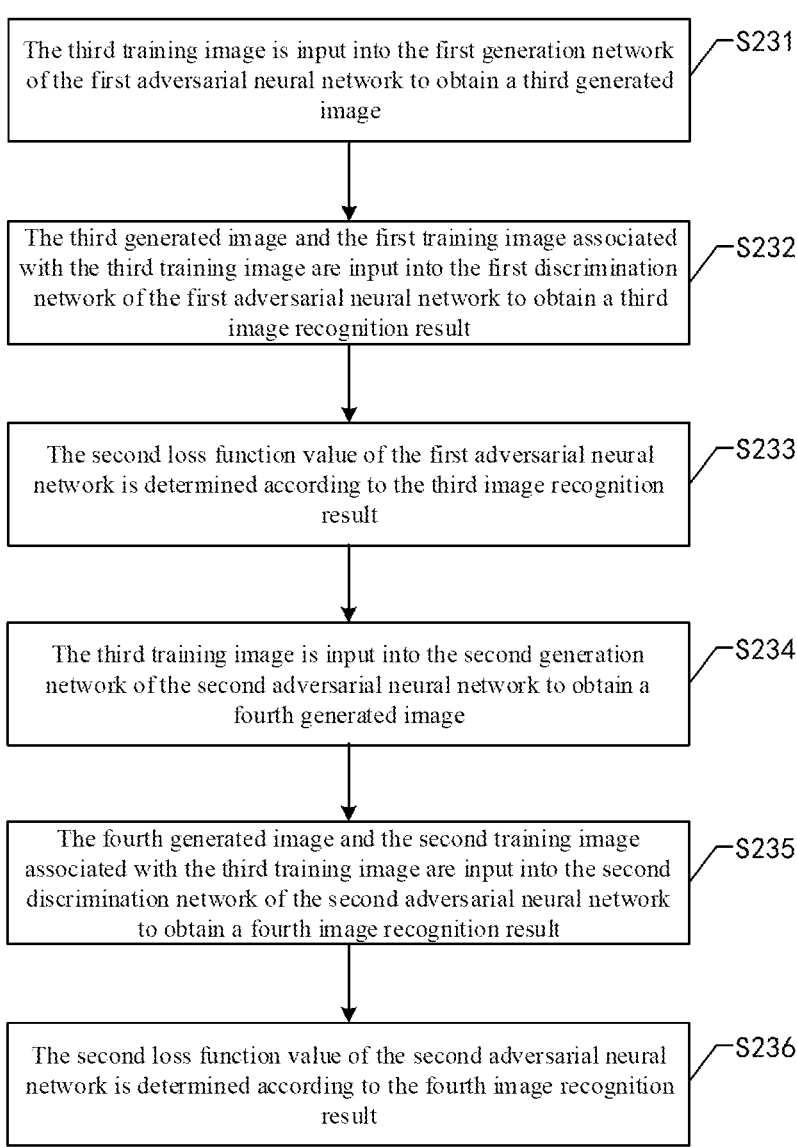

S230

The third training image is input into the first generation network of the first adversarial neural network to obtain a third generated image ⟋S231

The third generated image and the first training image associated with the third training image are input into the first discrimination network of the first adversarial neural network to obtain a third image recognition result ⟋S232

The second loss function value of the first adversarial neural network is determined according to the third image recognition result ⟋S233

The third training image is input into the second generation network of the second adversarial neural network to obtain a fourth generated image ⟋S234

The fourth generated image and the second training image associated with the third training image are input into the second discrimination network of the second adversarial neural network to obtain a fourth image recognition result ⟋S235

The second loss function value of the second adversarial neural network is determined according to the fourth image recognition result ⟋S236

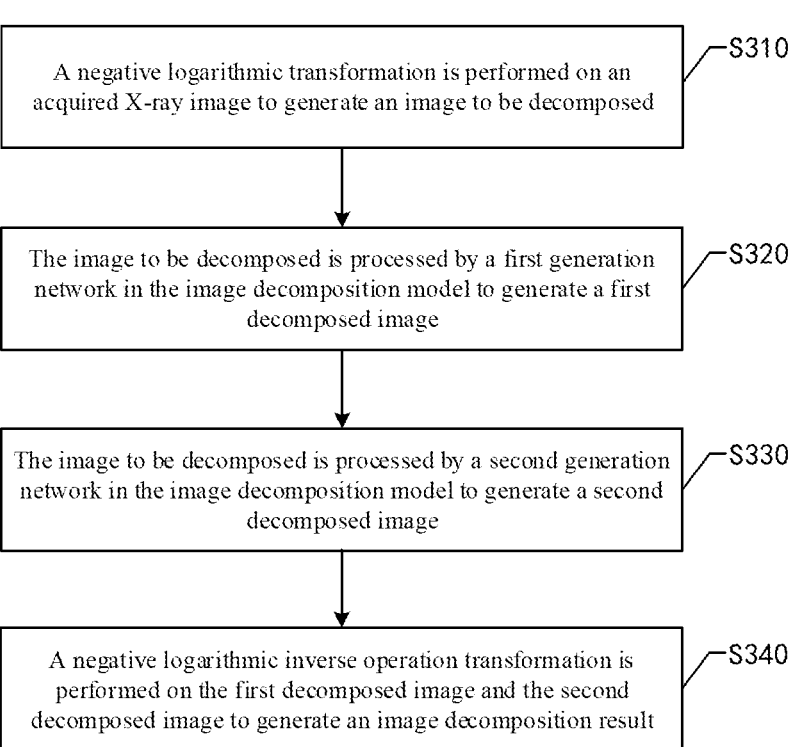

<u>300</u>

A negative logarithmic transformation is performed on an acquired X-ray image to generate an image to be decomposed    S310

The image to be decomposed is processed by a first generation network in the image decomposition model to generate a first decomposed image    S320

The image to be decomposed is processed by a second generation network in the image decomposition model to generate a second decomposed image    S330

A negative logarithmic inverse operation transformation is performed on the first decomposed image and the second decomposed image to generate an image decomposition result    S340

FIG. 9 a
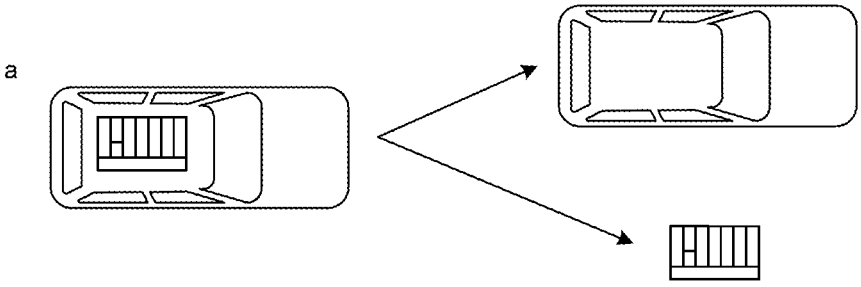
b
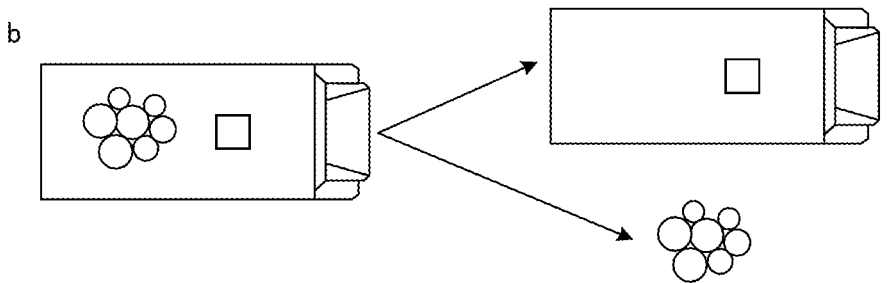
c
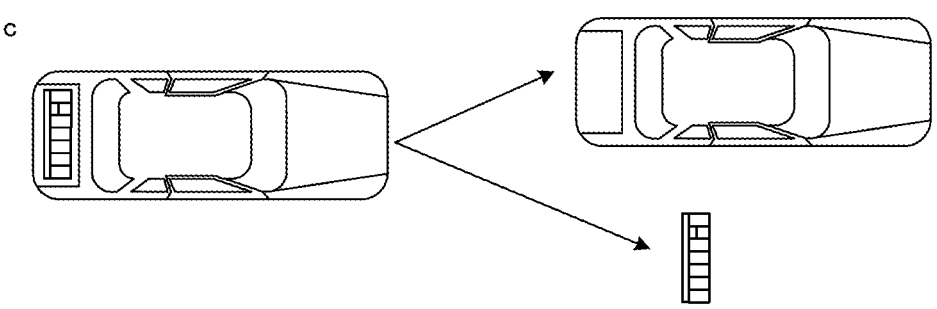
d
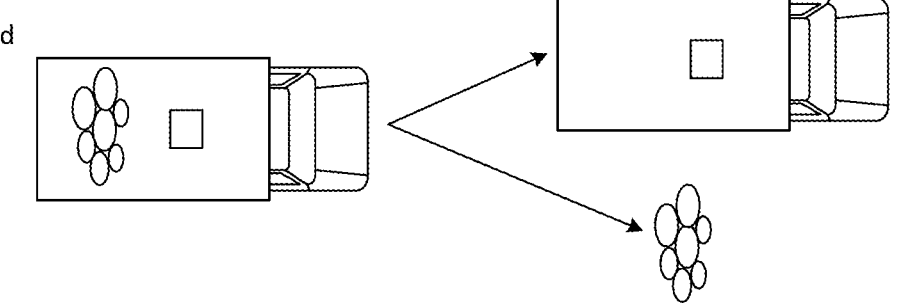
FIG. 10

METHOD OF TRAINING IMAGE DECOMPOSITION MODEL, METHOD OF DECOMPOSING IMAGE, ELECTRONIC DEVICE, AND STORAGE MEDIUM

CROSS-REFERENCE TO RELATED APPLICATIONS

This application is claims priority to Chinese Application No. 202210874253.6 filed on Jul. 22, 2022, which is incorporated herein by reference in its entirety.

TECHNICAL FIELD

The present disclosure relates to a field of an image processing technology, in particular to a method of training an image decomposition model, an apparatus of training an image decomposition model, a method of decomposing an image, an electronic device, and a readable storage medium.

BACKGROUND

With a development of a global economy, a cargo movement has become increasingly common. It is needed to inspect a cargo in circulation at customs, land ports, and other checkpoints to prevent illegal goods or products from entering a control region. At customs and land ports, due to a large flow of cargoes and a wide variety of cargoes, it is required to simultaneously inspect a cargo and a vehicle transporting the cargo by using a special detection device, such as an X-ray scanning system, so as to improve an efficiency of a security inspection.

At present, a common international security inspection method for a cargo vehicle is performed based on an X-ray scanning system. Firstly, a vehicle to be detected is scanned using an X-ray scanning device to form an X-ray scanning image. Then, it is determined whether there is a suspicious object in the vehicle through a manual image discrimination analysis or a machine intelligent recognition.

In a traditional manual image discrimination, due to a complex structure of a vehicle and an uneven stacking of cargo, it is difficult and inefficient to manually determine the cargo in the image, which may not meet requirements of a security inspection of a large number of vehicles for customs clearance. In recent years, a machine intelligent recognition system has been developed rapidly, which gradually replaces some manual works. Machine intelligent recognition has advantages of high speed and high efficiency, but its recognition accuracy still needs to be improved in a case of a complex image due to limitations of current intelligent image recognition algorithms. For example, a penetration characteristic of X-rays results in a severe overlap between a cargo information and a vehicle structure information in an image, then the cargo and the vehicle body may overlap and interfere with each other in the image, and it is difficult to distinguish a cargo feature. Then, it is difficult for a machine to accurately recognize the cargo, an accuracy of the machine recognition is greatly reduced, and it is difficult to achieve an accurate determination, so that a risk of missed detections may be increased, and an efficiency of the security inspection may be reduced.

In addition, training is required in a process of machine intelligent recognition, and a large number of data with true labels are required during the training process. However, the acquisition of real X-ray images and vehicle images is difficult, which requires a huge workload and a long time, so that it is difficult to acquire sufficient data with true values and to obtain sufficient true labels for supervised teaming. In addition, due to a superposition characteristic of the X-ray image, it is difficult for a labeling personnel to distinguish a vehicle and a cargo that are mixed in a same image. Moreover, a vehicle image is very complex, and there may be a significant difference between vehicles of a same vehicle category, which includes two aspects. On the one hand, there are differences in details caused by different model years, models, and high and low configurations of vehicles. On the other hand, vehicles with identical configurations may also have image differences due to different states of uncontrollable dynamic factors such as tires, engines, cylinders, window mirrors and other deformable parts during the scanning process. The above limits the accuracy of the machine intelligent recognition.

SUMMARY

The present disclosure provides a method and an apparatus of training an image decomposition model, a method of decomposing an image, an electronic device, and a readable storage medium, which may effectively improve an ability to decompose a complex image, thereby obtaining a more accurate cargo image, and further improving an accuracy of a machine determination.

According to a first aspect of the present disclosure, a method of training an image decomposition model is provided. The image decomposition model includes a first adversarial neural network and a second adversarial neural network, the first adversarial neural network includes a first generation network and a first discrimination network, and the second adversarial neural network includes a second generation network and a second discrimination network. The method of training the image decomposition model includes but is not limited to: acquiring a training set, where the training set includes a first training image, a second training image and a third training image, and the third training image is generated by fusing the first training image with the second training image; inputting the first training image into the first adversarial neural network and inputting the second training image into the second adversarial neural network, so as to determine a first loss function value of the first adversarial neural network and a first loss function value of the second adversarial neural network respectively; inputting the third training image into the first adversarial neural network and the second adversarial neural network respectively, so as to determine a second loss function value of the first adversarial neural network and a second loss function value of the second adversarial neural network respectively; determining a third loss function value according to a comparison result between an acquired fusion image and the third training image, wherein the fusion image is generated by fusing a generated image of the first adversarial neural network with a generated image of the second adversarial neural network; and adjusting a parameter of the image decomposition model by means of back propagation according to at least one of the first loss function value, the second loss function value, or the third loss function value, until a predetermined training end condition is met, where the first loss function value is calculated based on a first loss function, the second loss function value is calculated based on a second loss function, and the third loss function value is calculated based on a third loss function; and where the first loss function, the second loss function and the third loss function meet a predetermined weight relationship.

In some exemplary embodiments of the present disclosure, the inputting the first training image into the first adversarial neural network to determine a first loss function value of the first adversarial neural network includes: inputting the first training image into the first generation network of the first adversarial neural network to obtain a first generated image; inputting the first training image and the first generated image into the first discrimination network of the first adversarial neural network to obtain a first image recognition result; and determining the first loss function value of the first adversarial neural network according to the first image recognition result.

In some exemplary embodiments of the present disclosure, the inputting the second training image into the second adversarial neural network to determine a first loss function value of the second adversarial neural network includes: inputting the second training image into the second generation network of the second adversarial neural network to obtain a second generated image; inputting the second training image and the second generated image into the second discrimination network of the second adversarial neural network to obtain a second image recognition result; and determining the first loss function value of the second adversarial neural network according to the second image recognition result.

In some exemplary embodiments of the present disclosure, the inputting the third training image into the first adversarial neural network and the second adversarial neural network respectively to determine a second loss function value of the first adversarial neural network and a second loss function value of the second adversarial neural network respectively includes: inputting the third training image into the first generation network of the first adversarial neural network to obtain a third generated image; inputting the third generated image and the first training image associated with the third training image into the first discrimination network of the first adversarial neural network to obtain a third image recognition result; determining the second loss function value of the first adversarial neural network according to the third image recognition result; inputting the third training image into the second generation network of the second adversarial neural network to obtain a fourth generated image; inputting the fourth generated image and the second training image associated with the third training image into the second discrimination network of the second adversarial neural network to obtain a fourth image recognition result; and determining the second loss function value of the second adversarial neural network according to the fourth image recognition result.

In some exemplary embodiments of the present disclosure, the determining a third loss function value according to an acquired comparison result between an acquired fusion image and the third training image includes: fusing the third generated image with the fourth generated image according to an image fusion algorithm, so as to generate a fusion image; comparing the fusion image with the third training image to generate a comparison result; and determining the third loss function value according to the comparison result.

In some exemplary embodiments of the present disclosure, the second loss function includes a generator loss function and a discriminator loss function; and the second loss function value includes a generator loss function value and a discriminator loss function value.

In some exemplary embodiments of the present disclosure, the generator loss function in the second loss function has a predetermined weight greater than predetermined weights of other loss functions.

In some exemplary embodiments of the present disclosure, a training image in the training set is formed by performing a negative logarithm processing on an X-ray image.

In some exemplary embodiments of the present disclosure, the adjusting a parameter of the image decomposition model by means of back propagation according to the second loss function value includes: adjusting a parameter of the first generation network of the first adversarial neural network and a parameter of the second generation network of the second adversarial neural network according to the generator loss function value in the second loss function value; and adjusting a parameter of the first discrimination network of the first adversarial neural network and a parameter of the second discrimination network of the second adversarial neural network according to the discriminator loss function value in the second loss function value.

According to a second aspect of the present disclosure, a method of decomposing an image is provided, which is applicable to a decomposition of an X-ray image. The method includes: performing a negative logarithmic transformation on an acquired X-ray image to generate an image to be decomposed; processing the image to be decomposed by a first generation network in an image decomposition model, so as to generate a first decomposed image; processing the image to be decomposed by a second generation network in the image decomposition model, so as to generate a second decomposed image; and performing a negative logarithmic inverse operation transformation on the first decomposed image and the second decomposed image to generate an image decomposition result; where the image decomposition model includes a first adversarial neural network and a second adversarial neural network, the first adversarial neural network includes a first generation network and a first discrimination network, and the second adversarial neural network includes a second generation network and a second discrimination network; and where the image decomposition model is obtained according to the training method described above.

According to a third aspect of the present disclosure, an apparatus of training an image decomposition model is provided, where the image decomposition model includes a first adversarial neural network and a second adversarial neural network, the first adversarial neural network includes a first generation network and a first discrimination network, and the second adversarial neural network includes a second generation network and a second discrimination network. The training apparatus includes but is not limited to: a first acquisition module configured to acquire a training set, where the training set includes a first training image, a second training image and a third training image, and the third training image is generated by fusing the first training image with the second training image; a first loss function value determination module configured to input the first training image into the first adversarial neural network and input the second training image into the second adversarial neural network, so as to determine a first loss function value of the first adversarial neural network and a first loss function value of the second adversarial neural network respectively; a second loss function value determination module configured to input the third training image into the first adversarial neural network and the second adversarial neural network respectively, so as to determine a second loss function value of the first adversarial neural network and a second loss function value of the second adversarial neural network respectively; a third loss function value determination module configured to determine a third loss function value according to a comparison result between an acquired fusion image and the third training image, wherein the fusion image is generated by fusing a generated image of the first adversarial neural network with a generated image of the second adversarial neural network; and an adjustment module configured to adjust a parameter of the image decomposition model by means of back propagation according to at least one of the first loss function value, the second loss function value, or the third loss function value, until a predetermined training end condition is met, where the first loss function value is calculated based on a first loss function, the second loss function value is calculated based on a second loss function, and the third loss function value is calculated based on a third loss function; and where the first loss function, the second loss function and the third loss function meet a predetermined weight relationship.

In some exemplary embodiments of the present disclosure, the first loss function value determination module includes a first sub-unit configured to: input the first training image into the first generation network of the first adversarial neural network to obtain a first generated image; input the first training image and the first generated image into the first discrimination network of the first adversarial neural network to obtain a first image recognition result; and determine the first loss function value of the first adversarial neural network according to the first image recognition result.

In some exemplary embodiments of the present disclosure, the first loss function value determination module further includes a second sub-unit configured to: input the second training image into the second generation network of the second adversarial neural network to obtain a second generated image; input the second training image and the second generated image into the second discrimination network of the second adversarial neural network to obtain a second image recognition result; and determine the first loss function value of the second adversarial neural network according to the second image recognition result.

In some exemplary embodiments of the present disclosure, the second loss function value determination module includes a third sub-unit configured to: input the third training image into the first generation network of the first adversarial neural network to obtain a third generated image; input the third generated image and the first training image associated with the third training image into the first discrimination network of the first adversarial neural network to obtain a third image recognition result; determine the second loss function value of the first adversarial neural network according to the third image recognition result; input the third training image into the second generation network of the second adversarial neural network to obtain a fourth generated image; input the fourth generated image and the second training image associated with the third training image into the second discrimination network of the second adversarial neural network to obtain a fourth image recognition result; and determine the second loss function value of the second adversarial neural network according to the fourth image recognition result.

In some exemplary embodiments of the present disclosure, the third loss function value determination module includes a fourth sub-unit configured to: fuse the third generated image with the fourth generated image according to an image fusion algorithm, so as to generate a fusion image; compare the fusion image with the third training image to generate a comparison result; and determine the third loss function value according to the comparison result.

In some exemplary embodiments of the present disclosure, the second loss function includes a generator loss function and a discriminator loss function; and the second loss function value includes a generator loss function value and a discriminator loss function value.

In some exemplary embodiments of the present disclosure, the adjustment module includes a fifth sub-unit configured to: adjust a parameter of the first generation network of the first adversarial neural network and a parameter of the second generation network of the second adversarial neural network according to the generator loss function value in the second loss function value; and adjust a parameter of the first discrimination network of the first adversarial neural network and a parameter of the second discrimination network of the second adversarial neural network according to the discriminator loss function value in the second loss function value.

According to a fourth aspect of the present disclosure, an electronic device is provided, including: one or more processors; and a storage means for storing executable instructions, where the executable instructions, when executed by the one or more processors, are configured to implement the training method according to the first aspect or the method of decomposing the image according to the second aspect.

According to a fifth aspect of the present disclosure, a computer-readable storage medium having executable instructions therein is provided, where the instructions, when executed by a processor, are configured to implement the training method according to the first aspect or the method of decomposing the image according to the second aspect.

According to a sixth aspect of the present disclosure, a computer program product containing a computer program is provided, where the computer program, when executed by a processor, is configured to implement the training method according to the first aspect or the method of decomposing the image according to the second aspect.

BRIEF DESCRIPTION OF THE DRAWINGS

The above contents and other objectives, features and advantages of the present disclosure will be more apparent through the following descriptions of embodiments of the present disclosure with reference to the accompanying drawings, in which:

FIG. 2B schematically shows a flowchart of a method of training an image decomposition model according to embodiments of the present disclosure;

FIG. 5 schematically shows a flowchart of operation S230 in the method of training the image decomposition model according to embodiments of the present disclosure;

FIG. 9 schematically shows a flowchart of a method of decomposing an image according to embodiments of the present disclosure:

FIG. 10 schematically shows a schematic diagram of decomposing an image by using the method of decomposing the image according to embodiments of the present disclosure;

DETAILED DESCRIPTION OF EMBODIMENTS

Figure 1:
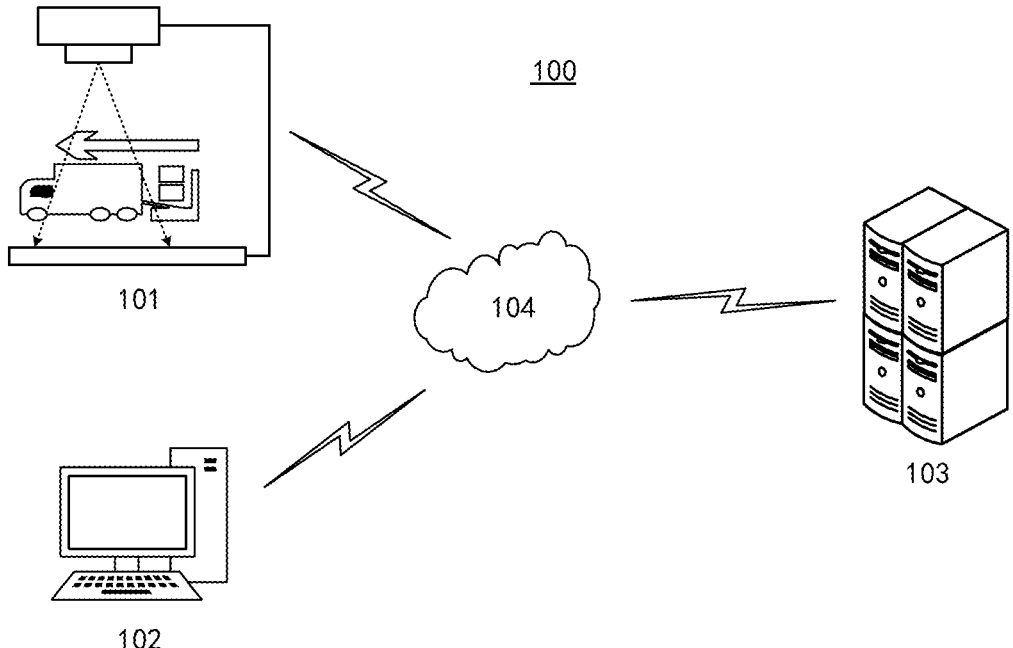
FIG. 1 schematically shows a system architecture to which a method of training an image decomposition model or a method of decomposing an image in embodiments of the present disclosure may be applied.

Embodiments of the present disclosure will be described below with reference to the accompanying drawings. It should be understood, however, that these descriptions are merely exemplary and are not intended to limit the scope of the present disclosure. In the following detailed descriptions, for ease of interpretation, many specific details are set forth to provide a comprehensive understanding of embodiments of the present disclosure. However, it is clear that one or more embodiments may also be implemented without these specific details. In addition, in the following descriptions, descriptions of well-known structures and technologies are omitted to avoid unnecessarily obscuring concepts of the present disclosure.

Terms used herein are for the purpose of describing specific embodiments only and are not intended to limit the present disclosure. The terms "including", "containing", etc. used herein indicate the presence of the feature, step, operation and/or component, but do not exclude the presence or addition of one or more other features, steps, operations or components.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or overly rigid manner.

In a case of using the expression similar to "at least one of A, B, or C", it should be explained according to the meaning of the expression generally understood by those skilled in the art (for example, "a system including at least one of A, B, or C" should include but not be limited to a system including A alone, a system including B alone, a system including C alone, a system including A and B, a system including A and C, a system including B and C, and/or a system including A, B and C).

In technical solutions of the present disclosure, an acquisition, a storage and an application of user personal information involved comply with provisions of relevant laws and regulations, take necessary security measures, and do not violate public order and good custom.

In the technical solutions of the present disclosure, the acquisition, storage and application of the user personal information has been authorized by users.

In embodiments of the present disclosure, in order to solve a problem of difficulty in accurately distinguishing features of an image in which a cargo overlaps with a vehicle body in a related art, embodiments of the present disclosure provide a method of training an image decomposition model, an apparatus of training an image decomposition model, a method of decomposing an image, an electronic device, a readable storage medium, and a computer program product, which may effectively achieve an accurate decomposition of an X-ray image in which a vehicle overlaps with a cargo, and effectively improve an efficiency of an image-based security inspection. The image decomposition model includes but is not limited to a first adversarial neural network and a second adversarial neural network. The first adversarial neural network includes a first generation network and a first discrimination network, and the second adversarial neural network includes a second generation network and a second discrimination network. The method of training the image decomposition model includes but is not limited to: acquiring a training set, where the training set includes a first training image, a second training image and a third training image, and the third training image is generated by fusing the first training image with the second training image; inputting the first training image into the first adversarial neural network and inputting the second training image into the second adversarial neural network, so as to determine a first loss function value of the first adversarial neural network and a first loss function value of the second adversarial neural network respectively; inputting the third training image into the first adversarial neural network and the second adversarial neural network respectively, so as to determine a second loss function value of the first adversarial neural network and a second loss function value of the second adversarial neural network respectively; determining a third loss function value according to a comparison result between an acquired fusion image and the third training image, where the fusion image is generated by fusing a generated image of the first adversarial neural network with a generated image of the second adversarial neural network; and adjusting a parameter of the image decomposition model by means of back propagation according to at least one of the first loss function value, the second loss function value, or the third loss function value, until a predetermined training end condition is met, where the first loss function value is calculated based on a first loss function, the second loss function value is calculated based on a second loss function, the third loss function value is calculated based on a third loss function, and the first loss function, the second loss function and the third loss function meet a predetermined weight relationship.

According to embodiments of the present disclosure, the parameter in the first image decomposition model is adjusted by providing a variety of training images (such as the first training image, the second training image, and the third training image) in the training set and determining the loss function values of different loss functions (such as the first loss function value, the second loss function value, and the third loss function value) according to the training results obtained from different input training images, so that the trained image decomposition model may effectively perform an accurate decomposition on an X-ray image in which a cargo overlaps with a vehicle body, so as to generate an X-ray image of the vehicle body and an X-ray image of the cargo separately, which may facilitate a further detection and analysis of the cargo image by an security inspection device and personnel, and improve the efficiency of the security inspection.

FIG. 1 schematically shows a system architecture to which a method of training an image decomposition model or a method of decomposing an image in embodiments of the present disclosure may be applied. It should be noted that FIG. 1 is merely an example of the system architecture to which embodiments of the present disclosure may be applied, so as to help those skilled in the art understand technical contents of the present disclosure. However, it does not mean that embodiments of the present disclosure may not be applied to other architectures, devices, systems, environments or scenarios. It should be noted that the method of training the image decomposition model, the apparatus of training the image decomposition model, the method of decomposing the image, the electronic device, and the computer-readable storage medium provided in embodiments of the present disclosure may be applied to a field of artificial intelligence technology, a field of image processing technology, and other fields. The application fields of the method of training the image decomposition model, the apparatus of training the image decomposition model, the method of decomposing the image, the electronic device, and the computer-readable storage medium are not limited here.

As shown in FIG. 1, a system architecture 100 according to exemplary embodiments of the present disclosure may include an X-ray image acquisition device 101, a terminal device 102, a server 103, and a network 104.

The network 104 serves as a medium for providing a communication link between the X-ray image acquisition device 101, the terminal device 102, and the server 103. The network 104 may include various connection types, such as a wired or wireless communication link, or a fiber optic cable.

The X-ray image acquisition device 101 may be used by a user to acquire an X-ray image of a target vehicle, and send the X-ray image through the network 102 to the terminal device 102 and the server 103 for storage or processing.

The terminal device 102 may be various electronic devices with display screens and supporting data processing, such as a tablet computer, a laptop computer, a desktop computer, etc.

The server 103 may be a server that provides various services, such as a background management server (just for example) that provides a support (such as storage or processing) for image data acquired by the user using the X-ray image acquisition device. The background management server may analyze and process the received user data, and feed back a processing result to the terminal device.

It should be noted that the method of training the image decomposition model or the method of decomposing the image provided in embodiments of the present disclosure may generally be performed by the server 103. Accordingly, the apparatus of training the image decomposition model provided in embodiments of the present disclosure may generally be arranged in the server 103. The method of training the image decomposition model or the method of decomposing the image provided in embodiments of the present disclosure may also be performed by a server or server cluster that is different from the server 103 and capable of communicating with the X-ray image acquisition device 101, the terminal device 102 and/or the server 103. Accordingly, the apparatus of training the image decomposition model provided in embodiments of the present disclosure may also be arranged in a server or server cluster that is different from the server 103 and capable of communicating with the X-ray image acquisition device 101, the terminal device 102 and/or the server 103.

It should be understood that the number of X-ray image acquisition device, terminal device, network and server in FIG. 1 is merely schematic. According to implementation needs, any number of X-ray image acquisition devices, terminal devices and servers may be provided.

Figure 2A:
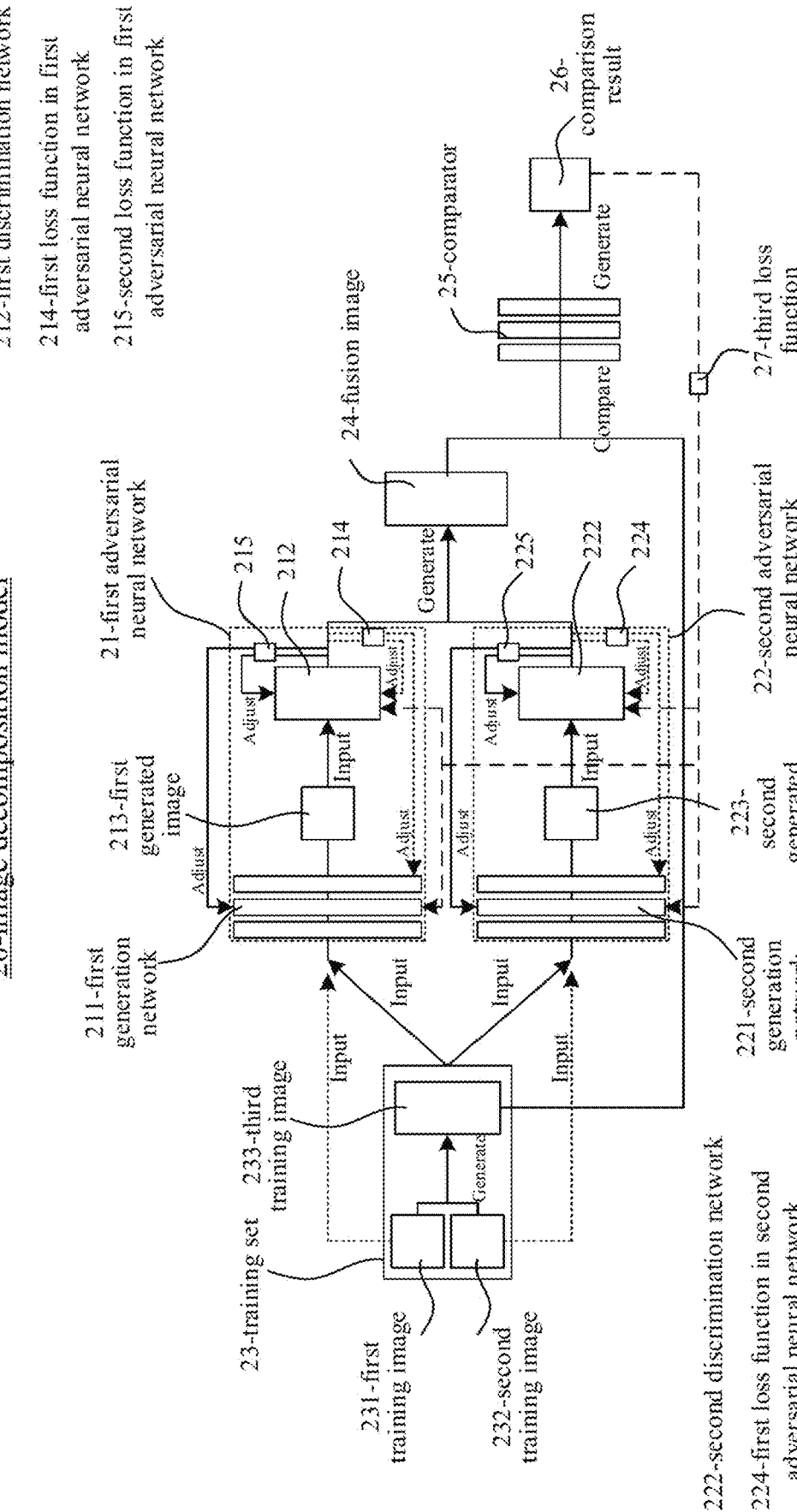
FIG. 2A schematically shows a schematic structural diagram of an image decomposition model according to embodiments of the present disclosure.
Figure 3:
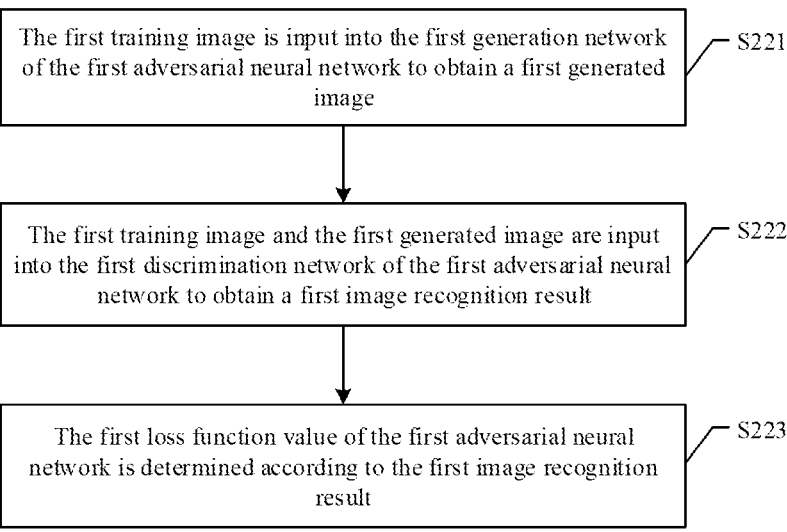
FIG. 3 schematically shows a flowchart of operation S220 in the method of training the image decomposition model according to an embodiment of the present disclosure.
Figure 4:
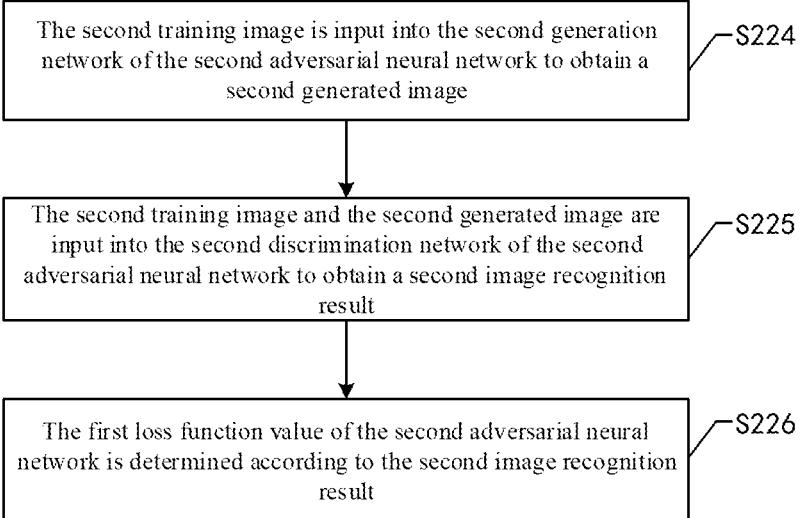
FIG. 4 schematically shows a flowchart of operation S220 in the method of training the image decomposition model according to another embodiment of the present disclosure.
Figure 6:
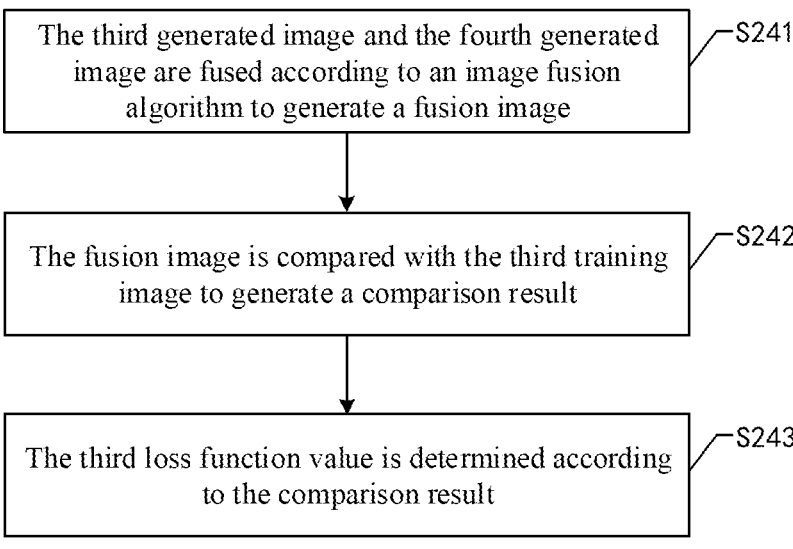
FIG. 6 schematically shows a flowchart of operating S240 in the method of training the image decomposition model according to embodiments of the present disclosure.
Figure 7:
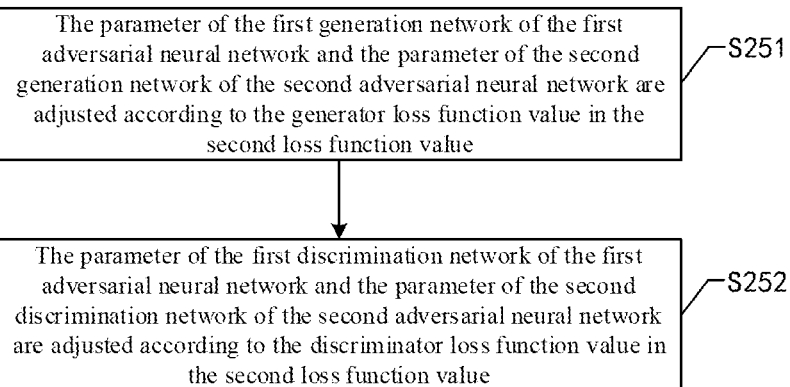
FIG. 7 schematically shows a flowchart of operating S250 in the method of training the image decomposition model according to embodiments of the present disclosure.
Figure 8A:
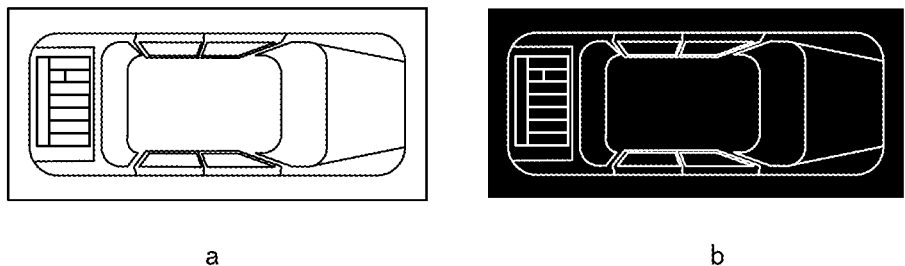
FIG. 8A schematically shows a schematic diagram of performing a negative logarithmic processing on an image in the method of training the image decomposition model according to embodiments of the present disclosure.
Figure 8B:
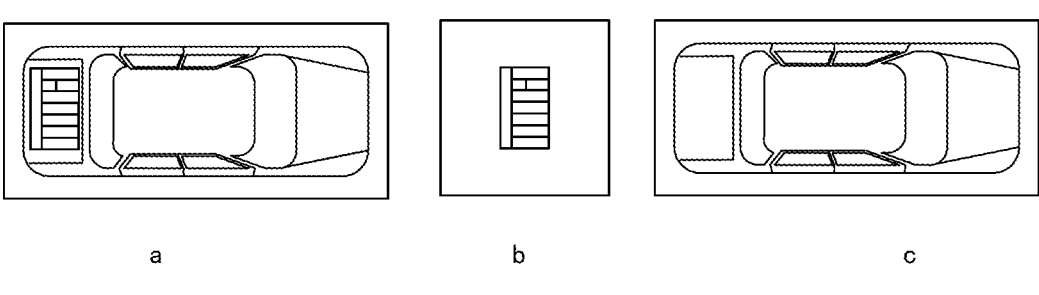
FIG. 8B schematically shows a schematic diagram of generating a third training image according to a first training image and a second training image.
Figure 8C:
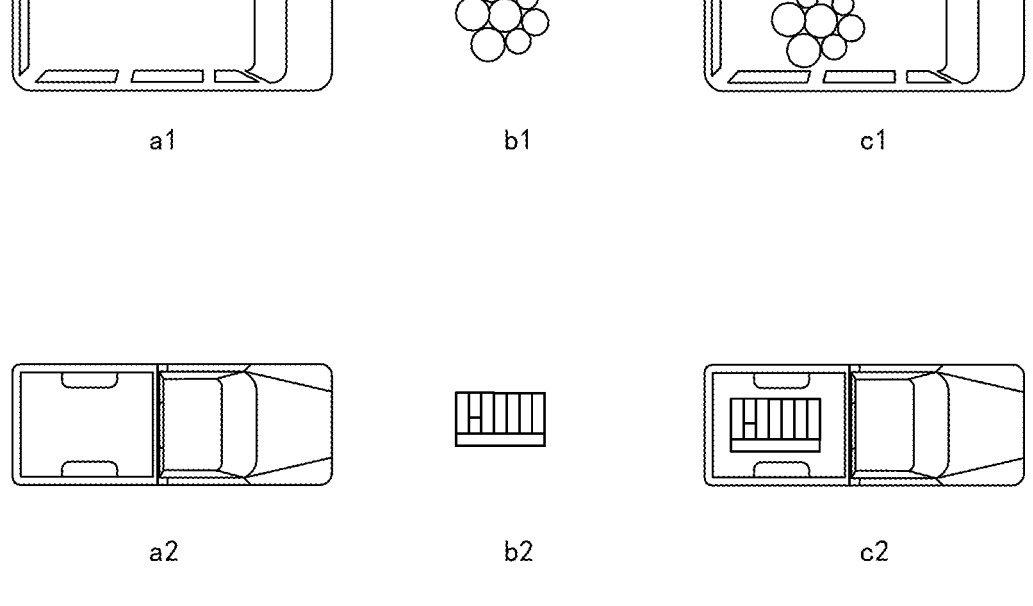
FIG. 8C schematically shows a schematic diagram of generating a fusion image according to a third generated image and a fourth generated image.

FIG. 2A schematically shows a schematic structural diagram of an image decomposition model according to embodiments of the present disclosure. FIG. 2B schematically shows a flowchart of a method of training an image decomposition model according to embodiments of the present disclosure. FIG. 3 schematically shows a flowchart of operation S220 in the method of training the image decomposition model according to an embodiment of the present disclosure. FIG. 4 schematically shows a flowchart of operation S220 in the method of training the image decomposition model according to another embodiment of the present disclosure. FIG. 5 schematically shows a flowchart of operation S230 in the method of training the image decomposition model according to embodiments of the present disclosure. FIG. 6 schematically shows a flowchart of operating S240 in the method of training the image decomposition model according to embodiments of the present disclosure. FIG. 7 schematically shows a flowchart of operating S250 in the method of training the image decomposition model according to embodiments of the present disclosure. FIG. 8A schematically shows a schematic diagram of performing a negative logarithmic processing on an image in the method of training the image decomposition model according to embodiments of the present disclosure. FIG. 8B schematically shows a schematic diagram of generating a third training image according to a first training image and a second training image. FIG. 8C schematically shows a schematic diagram of generating a fusion image according to a third generated image and a fourth generated image.

The method of training the image decomposition model in embodiments of the present disclosure will be described in detail below with reference to FIG. 2A to FIG. 8C.

As shown in FIG. 2A, an image decomposition model 20 in embodiments of the present disclosure includes a first adversarial neural network 21 and a second adversarial neural network 22. The first adversarial neural network 21 includes a first generation network 211 and a first discrimination network 212. The second adversarial neural network 22 includes a second generation network 221 and a second discrimination network 222. A training set 23 to be input into the image decomposition model 20 includes a first training image 231, a second training image 232, and a third training image 233.

As shown in FIG. 2B, the method of training the image decomposition model in embodiments of the present disclosure includes operation S210 to operation S250.

In operation S210, a training set is acquired. The training set includes a first training image, a second training image, and a third training image. The third training image is generated by fusing the first training image with the second training image.

In embodiments of the present disclosure, by fusing the first training image with the second training image to generate the third training image, a problem of difficulty in obtaining sufficient truth data is solved, which facilitates effective training of the image decomposition model.

In embodiments of the present disclosure, an X-ray scanning image is generated by scanning an object using an X-ray scanning device based on a principle of X-ray fluoroscopy imaging. Due to a fluoroscopy characteristic of radiation imaging, in an image formed by scanning a cargo vehicle, a cargo information and a vehicle structure information may overlap with each other, and it is difficult to distinguish the vehicle structure information and the cargo information in a confusion image through a manual labeling. Therefore, it is needed to synthesize a training image and a test image by a corresponding data synthesis measure. In addition, unlike visible light imaging, an image reconstruction of an X-ray image requires a corresponding pre-processing method to ensure an accuracy of an image fusion due to a principle of a multiplicative superposition of the X-ray image.

Before the X-ray image is used as a training image in the training set, the X-ray image is an image generated due to a signal penetrating a scanned object, in which different structures of the object may be revealed due to different attenuation characteristics of different substances. A gray-scale of the X-ray image, also known as transparency in physics, is defined as a ratio of a transmission intensity of X-rays passing through the scanned object to an incident intensity of an X-ray source, which may be expressed as Equation (1).

$$T = \frac{I}{I_0} = e^{-\int u(l)dl} \tag{1}$$

where u(l) is a linear mass attenuation coefficient. A linear attenuation of a superimposition of different materials exhibits an exponential characteristic along a ray path. Therefore, firstly the X-ray image is preprocessed. The preprocessing of the X-ray image may include performing a negative logarithmic processing on the image, as shown in FIG. 8A. Image a in FIG. 8A is an image on which the negative logarithmic processing is not performed, and image b is an image on which the negative logarithmic processing is performed. The image on which the negative logarithmic processing is performed is input into the image decomposition model, so that a superposition principle is satisfied when generating a fusion image.

In embodiments of the present disclosure, after a negative logarithmic processing is performed on the X-ray image, the obtained image is used as a training image. The first training image may be, for example, an empty vehicle image formed by an irradiation of the X-ray device. The second training image may be, for example, a cargo image formed by an irradiation of the X-ray device. The third training image is generated by fusing the first training image with the second training image. For example, the third training image is a cargo vehicle image generated by fusing the empty vehicle image with the cargo image through a multiplicative addition algorithm. As shown in FIG. 8B, image c is the first training image, image b is the second training image, and image a is the third training image. Each third training image is associated with a respective first training image and a respective second training image.

In embodiments of the present disclosure, the fusion of the first training image and the second training image to generate the third training image follows a principle of multiplicative addition, and the image fusion is based on Equation (2).

$$-\log(T_c) = -\log(T_a) - \log(T_b) \tag{2}$$

where $T_c$ represents a feature of the image c, $T_a$ represents a feature of the image a, and $T_b$ represents a feature of the image b.

In embodiments of the present disclosure, the first training image and the second training image may be processed before generating the third training image, for example, a de-noising or vehicle-cropping may be performed on the first training image and the second training image. After the third training image is synthesized, a random gray-scale transformation, a perspective transformation or other operations may be performed on the third training image to simulate substances with different thicknesses and different mass attenuation coefficients. Alternatively, the first training image, the second training image and the third training image may be processed (augmented) by using a random perspective transformation function with random positive and negative predetermined angles of X, Y and Z coordinate axes, to form training image data at a plurality of scanning angles in a plurality of directions. In this way, the number of training samples in the training set may be increased, and the trained image decomposition model has higher accuracy.

In operation S220, the first training image is input into the first adversarial neural network, and the second training image is input into the second adversarial neural network, so as to determine a first loss function value of the first adversarial neural network and a first loss function value of the second adversarial neural network respectively.

In embodiments of the present disclosure, as shown in FIG. 2A, the first adversarial neural network 21 and the second adversarial neural network 22 have the same framework and structure. Each adversarial neural network has a generator and a discriminator. The generator is used to generate a new image based on the input training image. The discriminator is used to perform a discrimination on the image generated by the generator.

For example, the training images input into the first generation network and the second generation network may have a size of 1024*1024, with three channels. The first generation network 211 and the second generation network 221 may have, for example, a pix2pix framework, and the generator may have a U-net structure, with four down-sampling layers, a bn layer and a dropout layer. The first discrimination network 212 and the second discrimination network 222 may have, for example, a PatchGAN structure, with four down-sampling layers and a bn layer.

Combined with identity loss of Cycle GAN idea, a first loss function (id loss) is provided in the first adversarial neural network 21 and the second adversarial neural network 22. For example, as shown in FIG. 2A, a first loss function 214 is provided in the first adversarial neural network 21, and a first loss function 224 is provided in the second adversarial neural network 22. The first loss function value of the first adversarial neural network 21 and the first loss function value of the second adversarial neural network 22 are determined respectively according to the input first training image 231 and the second training image 232.

FIG. 3 schematically shows a flowchart of operation S220 in the method of training the image decomposition model according to an embodiment of the present disclosure. FIG. 4 schematically shows a flowchart of operation S220 in the method of training the image decomposition model according to another embodiment of the present disclosure.

A detailed description of operation S220 in embodiments of the present disclosure will be provided below with reference to FIG. 2A, FIG. 3 and FIG. 4. As shown in FIG. 3, operation S220 includes operation S221 to operation S223.

In operation S221, the first training image 231 is input into the first generation network 211 of the first adversarial neural network 21 to obtain a first generated image 213.

In embodiments of the present disclosure, the first training image may be a real image, such as an empty vehicle image, which is used as the input image of the first adversarial neural network. The first generated image is a fake image generated according to the first training image.

In operation S222, the first training image 231 and the first generated image 213 are input into the first discrimination network 212 of the first adversarial neural network 21 to obtain a first image recognition result.

After the first training image and the first generated image are input into the first discrimination network, the first discrimination network performs a discrimination on the input image to determine whether the first generated image generated by the first generator is real or fake.

In operation S223, the first loss function value of the first adversarial neural network 21 is determined according to the first image recognition result.

In embodiments of the present disclosure, the first loss function may be, for example, an L1 loss function, that is, a least absolute deviation (LAD) and a least absolute error (LAE).

For example, according to the determined first loss function value of the first adversarial neural network, a parameter of the first adversarial neural network 21 may be adjusted through a back propagation algorithm.

As shown in FIG. 4, operation S220 includes operation S224 to operation S226.

As shown in FIG. 2A and FIG. 4, in operation S224, the second training image 232 is input into the second generation network 221 of the second adversarial neural network 22 to obtain a second generated image 223.

In embodiments of the present disclosure, the second training image may be a real image, such as a cargo image, which is used as the input image of the first adversarial neural network. The second generated image is a fake image generated according to the second training image.

For example, the cargo image may be an image of air, i.e., a blank image, so that the first adversarial neural network and the second adversarial neural network may have a good decomposition effect on an image without cargo.

In operation S225, the second training image 232 and the second generated image 223 are input into the second discrimination network 222 of the second adversarial neural network 22 to obtain a second image recognition result.

After the second training image and the second generated image are input into the second discrimination network, the second discrimination network performs a discrimination on the input image to determine whether the second generated image generated by the second generator is real or fake.

In operation S226, the first loss function value of the second adversarial neural network 22 is determined according to the second image recognition result.

In embodiments of the present disclosure, the first loss function may be, for example, an L1 loss function, that is, a least absolute deviation (LAD) and a least absolute error (LAE). The first loss function may include, for example, a generator loss function, such as a generator loss function of the first generation network and/or a generator loss function of the second generation network.

For example, a parameter of the second adversarial neural network 22 may be adjusted through a back propagation algorithm according to the determined first loss function value of the second adversarial neural network.

In embodiments of the present disclosure, in operation S220, the first training image 231 and the second training image 232 are respectively input into the first adversarial neural network. Specifically, the first training image 231 is an empty vehicle image, and the second training image 232 may be a blank image, that is, a blank image without cargo, so that the first loss function value may be determined based on the first loss function to solve a problem of a decomposition of a vehicle without cargo. By providing the first loss function and adjusting the parameter of the first adversarial neural network and the parameter of the second adversarial neural network based on the determined first loss function value, the trained image decomposition model may have a higher recognition accuracy and may recognize a vehicle without cargo, so that an effect of the image decomposition based on the image decomposition model may be improved.

In operation S230, the third training image is input into the first adversarial neural network and the second adversarial neural network respectively to determine a second loss function value of the first adversarial neural network and a second loss function value of the second adversarial neural network respectively.

FIG. 5 schematically shows a flowchart of the method of training the image decomposition model in operation S230 according to embodiments of the present disclosure.

A detailed description of operation S230 will be provided below with reference to FIG. 2A and FIG. 5. The operation S230 includes operation S231 to operation S236.

In operation S231, the third training image 233 is input into the first generation network 211 of the first adversarial neural network 21 to obtain a third generated image 213.

In embodiments of the present disclosure, each third training image 233 is associated with a first training image 231 and a second training image 232. That is, each third training image 233 is generated by fusing a first training image 231 with a second training image 232. When the third training image 233 is acquired, the first training image 231 and the second training image 232 associated with the third training image may be determined according to an association relationship.

In operation S232, the third generated image 213 and the First training image 231 associated with the third training image 233 are input into the first discrimination network 212 of the first adversarial neural network 21 to obtain a third image recognition result.

In embodiments of the present disclosure, the third generated image 213 is a fake image generated by the first generation network according to the input third training image. A level of realness of the third generated image 213 generated by the first generation network may be determined by inputting the third generated image 213 and the first training image 231 associated with the third training image 233 into the first discrimination network.

For example, the cargo vehicle image generated by fusion is input into the first generation network 211 to generate a vehicle image.

In operation S233, the second loss function value of the first adversarial neural network 21 is determined according to the third image recognition result.

In embodiments of the present disclosure, the first adversarial neural network has a second loss function 215. The second loss function value of the first adversarial neural network 21 is determined according to the second loss function 215 and the third image recognition result. The parameter of the first adversarial neural network is adjusted by means of back propagation according to the determined second loss function value.

In operation S234, the third training image 233 is input into the second generation network 221 of the second adversarial neural network 22 to obtain a fourth generated image 223.

In embodiments of the present disclosure, the fourth generated image 223 is a fake image generated by the second generation network 221 according to the input third training image.

For example, the cargo vehicle image generated by fusion is input into the second generation network 221 to generate a cargo image.

In operation S235, the fourth generated image 223 and the second training image 232 associated with the third training image 233 are input into the second discrimination network 222 of the second adversarial neural network to obtain a fourth image recognition result.

In embodiments of the present disclosure, a level of realness of the fourth generated image 223 generated by the second generation network 221 is determined by inputting the third generated image 213 and the second training image 232 associated with the third training image 233 into the second discrimination network 222.

In operation S236, the second loss function value of the second adversarial neural network 22 is determined according to the fourth image recognition result.

In embodiments of the present disclosure, the second adversarial neural network has a second loss function 225. The second loss function value of the second adversarial neural network 22 is determined according to the second loss function 225 and the fourth image recognition result. The parameter of the second adversarial neural network is adjusted by means of back propagation according to the determined second loss function value.

In embodiments of the present disclosure, the second loss function includes a generator loss function and a discriminator loss function, and the second loss function value includes a generator loss function value and a discriminator loss function value.

For example, the generator loss function may be an L1 loss function. The discriminator loss function may have, for example, a PatchGAN structure, and a BCE (Binary Cross Entry) loss function may be used.

For example, the first adversarial generation network may adjust the parameter of the first generation network by means of back propagation by acquiring the generator loss function value in the second loss function, and adjust the parameter of the first discrimination network by means of back propagation by acquiring the discriminator loss function value in the second loss function.

For another example, the second adversarial generation network may adjust the parameter of the second generation network by means of back propagation by acquiring the generator loss function value in the second loss function, and adjust the parameter of the second discrimination network by means of back propagation by acquiring the discriminator loss function value in the second loss function.

In operation S240, a third loss function value is determined according to a comparison result between an acquired fusion image and the third training image. The fusion image is generated by fusing the generated image of the first adversarial neural network with the generated image of the second adversarial neural network.

FIG. 6 schematically shows a flowchart of the method of training the image decomposition model in operating S240 according to embodiments of the present disclosure.

A detailed description of operation S24) will be provided below with reference to FIG. 2A and FIG. 6. The operation S240 includes operation S241 to operation S243.

In embodiments of the present disclosure, the third generated image and the fourth generated image are fake images generated by the first generation network and the second generation network according to the input third training image, respectively.

In operation S241, the third generated image 213 and the fourth generated image 223 are fused according to an image fusion algorithm to generate a fusion image 24.

In embodiments of the present disclosure, the third generated image and the fourth generated image may be fused using the image fusion algorithm through, for example, Equation (2) mentioned above, so as to generate a fusion image. When the first generation network and the second generation network are trained to achieve an accurate effect, the generated fusion image may highly similar to the third training image. In a case of a low similarity between the generated fusion image and the third training image, it indicates that the first generation network and the second generation network have not been trained well and needs to be further trained.

As shown in FIG. 8C, for example, image a1 is an empty vehicle image generated by the first generation network, image b1 is a cargo image generated by the second generation network, and image c1 is a fusion image generated by fusing the empty vehicle image generated by the first generation network with the cargo image generated by the second generation network through a fusion algorithm.

For another example, image a2 is another empty vehicle image generated by the first generation network, image b2 is another cargo image generated by the second generation network, and image c2 is a fusion image generated by fusing the another empty vehicle image generated by the first generation network with the another cargo image generated by the second generation network through a fusion algorithm.

In operation S242, the fusion image is compared with the third training image to generate a comparison result.

For example, a fusion image 24 may be compared with the third training image 233 in a comparator 25 to generate a comparison result 26. For example, a similarity between the fusion image 24 and the third training image may be determined by comparison.

In operation S243, the third loss function value is determined according to the comparison result.

For example, a size of the third loss function value may be determined according to the generated comparison result 26 and a third loss function 27. The third loss function may be used to adjust the parameter of the first adversarial neural network 21 and the parameter of the second adversarial neural network 22 by means of back propagation, so that the image of the first adversarial neural network and the image of the second adversarial neural network are closer to be real.

For example, the third loss function may be an L1 loss function. The third loss function may include, for example, a generator loss function, such as a generator loss function of the first generation network and/or a generator loss function of the second generation network.

In operation S250, the parameter of the image decomposition model is adjusted by means of back propagation according to at least one of the first loss function value, the second loss function value, or the third loss function value, until a predetermined training end condition is met. The first loss function value is calculated based on the first loss function, the second loss function value is calculated based on the second loss function, and the third loss function value is calculated based on the third loss function. The first loss function, the second loss function and the third loss function meet a predetermined weight relationship.

In embodiments of the present disclosure, the parameter of the image decomposition model is adjusted by means of back propagation according to at least one of the first loss function value, the second loss function value, or the third loss function value, until the predetermined training end condition is met.

Exemplarily, the parameter of the image decomposition model may be adjusted by means of back propagation according to the first loss function value. For example, the parameter of the first generation network in the first adversarial neural network and/or the parameter of the second generation network in the second adversarial neural network in the image decomposition model may be adjusted by means of back propagation according to the first loss function value.

Exemplarily, the parameter of the image decomposition model may be adjusted by means of back propagation according to the second loss function value. For example, the parameter of the first generation network and the parameter of the first discrimination network in the first adversarial neural network and/or the parameter of the second generation network and the parameter of the second discrimination network in the second adversarial neural network in the image decomposition model may be adjusted by means of back propagation according to the second loss function value.

Exemplarily, the parameter of the image decomposition model may be adjusted by means of back propagation according to the third loss function value. For example, the parameter of the first generation network in the first adversarial neural network and/or the parameter of the second generation network in the second adversarial neural network in the image decomposition model may be adjusted by means of back propagation according to the third loss function value.

Exemplarily, the parameter of the image decomposition model may be adjusted by means of back propagation according to more than one of the first loss function value, the second loss function value, or the third loss function value. Specifically, the parameter of the first generation network and the parameter of the second generation network may be adjusted according to the weights of different loss functions.

In embodiments of the present disclosure, the first loss function, the second loss function and the third loss function meet the predetermined weight relationship, which may be described, for example, by Equation (3).

$$\text{Total}_{loss}=G_{loss}\times100.0+D_{loss}\times1.0+id_{loss}\times1.0+\text{Recon-}_{loss}\times1.0 \quad (3)$$

where $id_{loss}$, represents the first loss function, $G_{loss}$, represents the generator loss function in the second loss function, $D_{loss}$, represents the discriminator loss function in the second loss function, and $\text{Recon}_{loss}$, represents the third loss function.

In embodiments of the present disclosure, the generator loss function $G_{loss}$, in the second loss function has a predetermined weight greater than other loss functions (for example, the first loss function, the discriminator loss function, and the third loss function), so that the generated image may be closer to a true value.

In a process of training the image decomposition model, the parameter of the image decomposition model may be adjusted by means of back propagation by determining at least one of the first loss function value, the second loss function value, or the third loss function value, until the predetermined training end condition is met. The parameter of the image decomposition model may be adjusted according to one of the loss function values, or according to the predetermined weight relationship, so that the image decomposition model may be trained more quickly, and the trained image decomposition model may achieve a more accurate decomposition effect on the X-ray image.

In embodiments of the present disclosure, the parameter of the image decomposition model is adjusted by means of back propagation until the predetermined training end condition is met. For example, the training of the image decomposition model may be completed when the first discrimination network and the second discrimination network fails to determine whether the third generated image generated by the first generation network and the fourth generated image generated by the second generation network are real or fake and a similarity between the fusion image generated by fusing the third generated image with the fourth generated image and the third training image exceeds a predetermined threshold.

In adjusting the parameter of the image decomposition model by means of back propagation, a gradient optimization method may be used, which may include, for example, batch gradient descent (BGD), stochastic gradient descent (SGD), mini-batch stochastic gradient descent (MBSGD), momentum gradient descent (Momentum), adaptive optimization (AdaGrad), or other methods. Preferably, an adaptive moment estimation algorithm (Adam) is adopted in this embodiment.

Exemplarily, the adaptive moment estimation algorithm (Adam) is used, with a learning rate parameter of $2e$-$4$ and a betas parameter of 0.5~0.999.

FIG. 7 schematically shows a flowchart of the method of training the image decomposition model in operating S250 according to embodiments of the present disclosure.

Operation S250 includes operation S251 to operation S252.

In operation S251, the parameter of the first generation network of the first adversarial neural network and the parameter of the second generation network of the second adversarial neural network are adjusted according to the generator loss function value in the second loss function value.

In operation S252, the parameter of the first discrimination network of the first adversarial neural network and the parameter of the second discrimination network of the second adversarial neural network are adjusted according to the discriminator loss function value in the second loss function value.

In embodiments of the present disclosure, after the training of the image decomposition model is completed, a test image is input into the image decomposition model to obtain a test result.

In embodiments of the present disclosure, a vehicle image is generated by an X-ray radiation on an empty vehicle, and a cargo image is generated by an X-ray radiation on a cargo. The vehicle image, the cargo image, and a fusion image generated by fusing the vehicle image with the cargo image are acquired to obtain a training set, for example, including 75000 images, for training the image decomposition model.

The trained image decomposition model may be tested on a real database of 5000 cargo vehicle images. The training is performed on a k80 server, and a convergence rate is about 8 hours, where 50000 iterations are performed, with a batch size of 4.

FIG. 9 schematically shows a flowchart of a method of decomposing an image according to embodiments of the present disclosure.

In exemplary embodiments of the present disclosure, a method of decomposing an image is further provided, which is applicable to an X-ray image decomposition. As shown in FIG. 9, a method 300 of decomposing an image includes operation S310 to operation S340.

In operation S310, a negative logarithmic transformation is performed on an acquired X-ray image to generate an image to be decomposed.

In embodiments of the present disclosure, the negative logarithmic transformation is performed on the X-ray image to facilitate an accurate decomposition of the image to be decomposed in the image decomposition model.

In operation S320, the image to be decomposed is processed by a first generation network in the image decomposition model to generate a first decomposed image.

In operation S330, the image to be decomposed is processed by a second generation network in the image decomposition model to generate a second decomposed image.

In embodiments of the present disclosure, both the first generation network and the second generation network are obtained by training, have a good decomposition effect on the X-ray image, and may accurately obtain the vehicle image and the cargo image in the X-ray image.

In operation S340, a negative logarithmic inverse operation transformation is performed on the first decomposed image and the second decomposed image to generate an image decomposition result.

In embodiments of the present disclosure, by performing the negative logarithmic inverse operation transformation on the first decomposed image and the second decomposed image to obtain the image decomposition result, it is convenient to perform a manual observation or machine processing on the image decomposition result.

In embodiments of the present disclosure, the image decomposition model includes a first adversarial neural network and a second adversarial neural network. The first adversarial neural network includes a first generation network and a first discrimination network. The second adversarial neural network includes a second generation network and a second discrimination network. The image decomposition model used in the method of decomposing the image is obtained according to the above-mentioned method of training the image decomposition model.

FIG. 10 schematically shows a schematic diagram of decomposing an image by using the method of decomposing the image according to embodiments of the present disclosure.

As shown in FIG. 10, each of image a, image b, image c and image d may be an image of vehicle with cargo. After the image of vehicle with cargo is acquired, the image may be decomposed to obtain an image of vehicle and an image of cargo separately. Specifically, the image a, the image b, the image c and the image d are decomposed respectively by the above-mentioned method of decomposing the image, so as to obtain decomposed images of vehicle with cargo.

According to embodiments of the present disclosure, the parameter in the first image decomposition model is adjusted by providing a variety of training images (such as the first training image, the second training image, and the third training image) in the training set and determining the loss function values of different loss functions (such as the first loss function value, the second loss function value, and the third loss function value) according to the training results obtained from different input training images, so that the trained image decomposition model may effectively perform an accurate decomposition on an X-ray image in which a cargo overlaps with a vehicle body, so as to generate an X-ray image of the vehicle body and an X-ray image of the cargo separately, which may facilitate a further detection and analysis of the cargo image by an security inspection device and personnel, and improve the efficiency of the security inspection.

Figure 11:
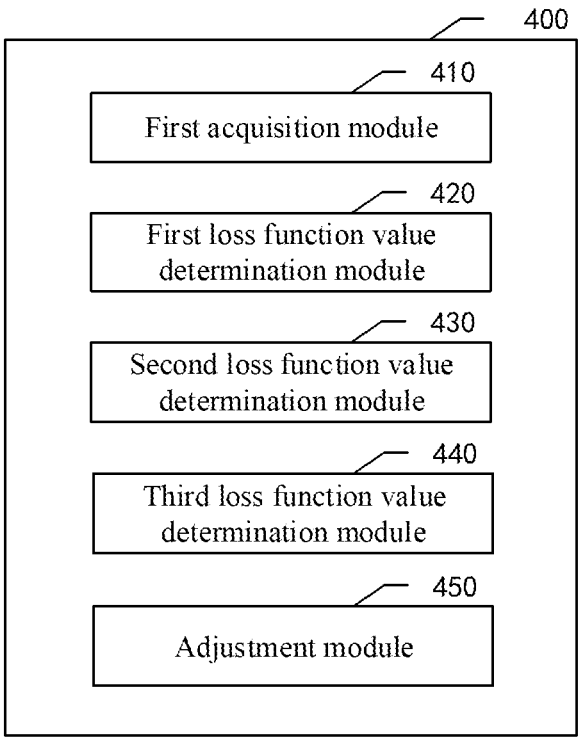
FIG. 11 schematically shows a structural block diagram of an apparatus of training an image decomposition model according to embodiments of the present disclosure.

FIG. 11 schematically shows a structural block diagram of an apparatus of training an image decomposition model according to embodiments of the present disclosure.

As shown in FIG. 11, an apparatus 400 of training an image decomposition model according to embodiments of the present disclosure includes a first acquisition module 410, a first loss function value determination module 420, a second loss function value determination module 430, a third loss function value determination module 440, and an adjustment module 450.

The first acquisition module 410 is used to acquire a training set. The training set includes a first training image, a second training image and a third training image, and the third training image is generated by fusing the first training image with the second training image. In an embodiment, the first acquisition module 410 may be used to perform operation S210 described above, which will not be repeated here.

The first loss function value determination module 420 is used to input the first training image into the first adversarial neural network and input the second training image into the second adversarial neural network, so as to determine a first loss function value of the first adversarial neural network and a first loss function value of the second adversarial neural network respectively. In an embodiment, the first loss function value determination module 420 may be used to perform operation S220 described above, which will not be repeated here.

The second loss function value determination module 430 is used to input the third training image into the first adversarial neural network and the second adversarial neural network respectively, so as to determine a second loss function value of the first adversarial neural network and a second loss function value of the second adversarial neural network respectively. In an embodiment, the second loss function value determination module 430 may be used to perform operation S230 described above, which will not be repeated here.

The third loss function value determination module 440 is used to determine a third loss function value according to a comparison result between an acquired fusion image and the third training image. The fusion image is generated by fusing a generated image of the first adversarial neural network with a generated image of the second adversarial neural network. In an embodiment, the third loss function value determination module 440 may be used to perform operation S240 described above, which will not be repeated here.

The adjustment module 450 is used to adjust a parameter of the image decomposition model by means of back propagation according to at least one of the first loss function value, the second loss function value, or the third loss function value, until a predetermined training end condition is met. The first loss function value is calculated based on a first loss function, the second loss function value is calculated based on a second loss function, and the third loss function value is calculated based on a third loss function. The first loss function, the second loss function and the third loss function meet a predetermined weight relationship. In an embodiment, the adjustment module 450 may be used to perform operation S250 described above, which will not be repeated here.

In some exemplary embodiments of the present disclosure, the first loss function value determination module further includes a first sub-unit used to; input the first training image into the first generation network of the first adversarial neural network to obtain a first generated image; input the first training image and the first generated image into the first discrimination network of the first adversarial neural network to obtain a first image recognition result; and determine the first loss function value of the first adversarial neural network according to the first image recognition result.

In some exemplary embodiments of the present disclosure, the first loss function value determination module further includes a second sub-unit used to; input the second training image into the second generation network of the second adversarial neural network to obtain a second generated image, input the second training image and the second generated image into the second discrimination network of the second adversarial neural network to obtain a second image recognition result; and determine the first loss function value of the second adversarial neural network according to the second image recognition result.

In some exemplary embodiments of the present disclosure, the second loss function value determination module includes a third sub-unit used to: input the third training image into the first generation network of the first adversarial neural network to obtain a third generated image; input the third generated image and the first training image associated with the third training image into the first discrimination network of the first adversarial neural network to obtain a third image recognition result; determine the second loss function value of the first adversarial neural network according to the third image recognition result; input the third training image into the second generation network of the second adversarial neural network to obtain a fourth generated image; input the fourth generated image and the second training image associated with the third training image into the second discrimination network of the second adversarial neural network to obtain a fourth image recognition result; and determine the second loss function value of the second adversarial neural network according to the fourth image recognition result.

In some exemplary embodiments of the present disclosure, the third loss function value determination module includes a fourth sub-unit used to; fuse the third generated image with the fourth generated image according to an image fusion algorithm, so as to generate a fusion image; compare the fusion image with the third training image to generate a comparison result; and determine the third loss function value according to the comparison result.

In some exemplary embodiments of the present disclosure, the second loss function includes a generator loss function and a discriminator loss function; and the second loss function value includes a generator loss function value and a discriminator loss function value.

In some exemplary embodiments of the present disclosure, the adjustment module includes a fifth sub-unit used to; adjust a parameter of the first generation network of the first adversarial neural network and a parameter of the second generation network of the second adversarial neural network according to the generator loss function value in the second loss function value; and adjust a parameter of the first discrimination network of the first adversarial neural network and a parameter of the second discrimination network of the second adversarial neural network according to the discriminator loss function value in the second loss function value.

According to embodiments of the present disclosure, any number of the first acquisition module 410, the first loss function value determination module 420, the second loss function value determination module 430, the third loss function value determination module 440, and the adjustment module 450 may be combined into one module for implementation, or any one of the modules may be split into a plurality of modules. Alternatively, at least part of the functions of one or more of these modules may be combined with at least part of the functions of other modules and implemented in one module. According to embodiments of the present disclosure, at least one of the first acquisition module 410, the first loss function value determination module 420, the second loss function value determination module 430, the third loss function value determination module 440, and the adjustment module 450 may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by hardware or firmware in any other rational manner of integrating or encapsulating the circuit, or may be implemented by any one of the three implementation modes of software, hardware and firmware or an appropriate combination thereof. Alternatively, at least one of the first acquisition module 410, the first loss function value determination module 420, the second loss function value determination module 430, the third loss function value determination module 440, and the adjustment module 450 may be at least partially implemented as a computer program module that may perform the corresponding functions when executed.

Figure 12:
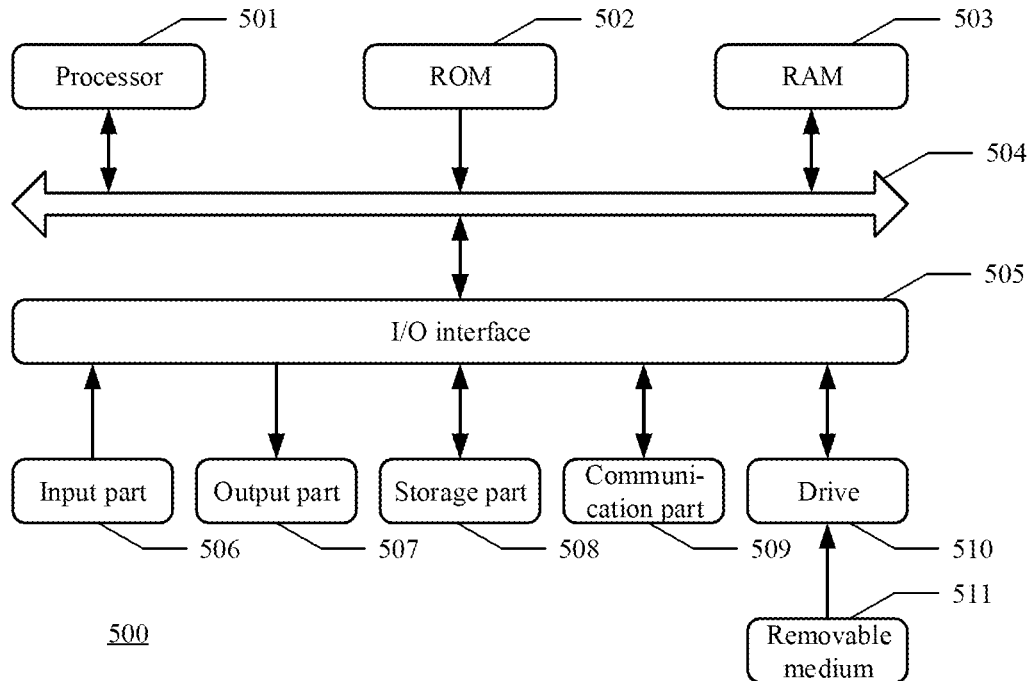
FIG. 12 schematically shows a block diagram of an electronic device suitable for implementing a method of training an image decomposition model or a method of decomposing an image according to embodiments of the present disclosure.

FIG. 12 schematically shows a block diagram of an electronic device suitable for implementing a method of training an image decomposition model or a method of decomposing an image according to embodiments of the present disclosure. The electronic device shown in FIG. 12 is just an example and should not bring any limitations to the function and scope of use of embodiments of the present disclosure.

As shown in FIG. 12, an electronic device 500 according to embodiments of the present disclosure includes a processor 501, which may perform various appropriate actions and processes according to a program stored in a read only memory (ROM) 502 or a program loaded from a storage part 508 into a random access memory (RAM) 503. The processor 501 may include, for example, a general-purpose microprocessor (for example, CPU), an instruction set processor and/or a related chipset and/or a special-purpose microprocessor (for example, an application specific integrated circuit (ASIC)), and the like. The processor 501 may further include an on-board memory for caching purposes. The processor 501 may include a single processing unit or a plurality of processing units for performing different actions of the method flow according to embodiments of the present disclosure.

Various programs and data required for the operation of the electronic device 500 are stored in the RAM 503. The processor 501, the ROM 502 and the RAM 503 are connected to each other through a bus 504. The processor 501 performs various operations of the method flow according to embodiments of the present disclosure by executing the programs in the ROM 502 and/or the RAM 503. It should be noted that the program may also be stored in one or more memories other than the ROM 502 and the RAM 503. The processor 501 may also perform various operations of the method flow according to embodiments of the present disclosure by executing the programs stored in the one or more memories.

According to embodiments of the present disclosure, the electronic device 500 may further include an input/output (I/O) interface 505 which is also connected to the bus 504. The electronic device 500 may further include one or more of the following components connected to the I/O interface 505: an input part 506 including a keyboard, a mouse, etc.; an output part 507 including a cathode ray tube (CRT), a liquid crystal display (LCD), etc. and a speaker, etc.; a storage part 508 including a hard disk, etc.; and a communication part 509 including a network interface card such as a LAN card, a modem, and the like. The communication part 509 performs communication processing via a network such as the Internet. A drive 510 is also connected to the I/O interface 505 as required. A removable medium 511, such as a magnetic disk, an optical disk, a magneto-optical disk, a semiconductor memory, and the like, is installed on the drive 510 as required, so that the computer program read therefrom is installed into the storage part 508.

The present disclosure further provides a computer-readable storage medium, which may be contained in the apparatus/device/system described in the above embodiments; or may exist alone without being assembled into the apparatus/device/system. The above-mentioned computer-readable storage medium carries one or more programs that perform the method of training the image decomposition model or the method of decomposing the image according to embodiments of the present disclosure when being executed.

According to embodiments of the present disclosure, the computer-readable storage medium may be a non-transitory computer-readable storage medium, for example, may include but not limited to: a portable computer disk, a hard disk, a random access memory (RAM), a read-only memory (ROM), an erasable programmable read-only memory (EPROM) or flash memory, a portable compact disk read-only memory (CD-ROM), an optical storage device, a magnetic storage device, or any suitable combination of the above. In the present disclosure, the computer-readable storage medium may be any tangible medium that contains or stores programs that may be used by or in combination with an instruction execution system, apparatus or device. For example, according to embodiments of the present disclosure, the computer-readable storage medium may include the above-mentioned ROM 502 and/or RAM 503 and/or one or more memories other than the ROM 502 and RAM 503.

Embodiments of the present disclosure further include a computer program product, which contains a computer program. The computer program contains program codes for performing the methods shown in the flowcharts. When the computer program product runs in a computer system, the program codes are used to cause the computer system to implement the method of training the image decomposition model or the method of decomposing the image provided in embodiments of the present disclosure.

When the computer program is executed by the processor 501, the above-mentioned functions defined in the system/ device of embodiments of the present disclosure are performed. According to embodiments of the present disclosure, the above-described systems, devices, modules, units, etc. may be implemented by computer program modules.

In an embodiment, the computer program may rely on a tangible storage medium such as an optical storage device and a magnetic storage device. In another embodiment, the computer program may also be transmitted and distributed in the form of signals on a network medium, downloaded and installed through the communication part 509, and/or installed from the removable medium 511. The program codes contained in the computer program may be transmitted by any suitable medium, including but not limited to a wireless one, a wired one, or any suitable combination of the above.

In such embodiments, the computer program may be downloaded and installed from the network through the communication part 509, and/or installed from the removable medium 511. When the computer program is executed by the processor 501, the above-mentioned functions defined in the system of the embodiments of the present disclosure are performed. According to embodiments of the present disclosure, the systems, devices, apparatuses, modules, units, etc. described above may be implemented through computer program modules.

According to embodiments of the present disclosure, the program codes for executing the computer programs provided by embodiments of the present disclosure may be written in any combination of one or more programming languages. In particular, these computing programs may be implemented using high-level procedures and/or object-oriented programming languages, and/or assembly/machine languages. Programming languages include, but are not limited to, Java, C++, Python, "C" language or similar programming languages. The program code may be completely executed on the user computing apparatus, partially executed on the user device, partially executed on the remote computing apparatus, or completely executed on the remote computing apparatus or server. In a case of involving a remote computing apparatus, the remote computing apparatus may be connected to a user computing apparatus through any kind of network, including a local area network (LAN) or a wide area networks (WAN), or may be connected to an external computing apparatus (e.g., through the Internet using an Internet service provider).

The flowcharts and block diagrams in the accompanying drawings illustrate the possible architecture, functions, and operations of the system, method, and computer program product according to various embodiments of the present disclosure. In this regard, each block in the flowcharts or block diagrams may represent a part of a module, a program segment, or a code, which part includes one or more executable instructions for implementing the specified logical function. It should be further noted that, in some alternative implementations, the functions noted in the blocks may also occur in a different order from that noted in the accompanying drawings. For example, two blocks shown in succession may actually be executed substantially in parallel, or they may sometimes be executed in a reverse order, depending on the functions involved. It should be further noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions.

Those skilled in the art may understand that the various embodiments of the present disclosure and/or the features described in the claims may be combined in various ways, even if such combinations are not explicitly described in the present disclosure. In particular, the various embodiments of the present disclosure and/or the features described in the claims may be combined in various ways without departing from the spirit and teachings of the present disclosure. All these combinations fall within the scope of the present disclosure.

Embodiments of the present disclosure have been described above. However, these embodiments are for illustrative purposes only, and are not intended to limit the scope of the present disclosure. Although the various embodiments have been described separately above, this does not mean that measures in the respective embodiments may not be used in combination advantageously. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. A method of training an image decomposition model, wherein the image decomposition model comprises a first adversarial neural network and a second adversarial neural network, the first adversarial neural network comprises a first generation network and a first discrimination network, and the second adversarial neural network comprises a second generation network and a second discrimination network;

the training method comprising:

acquiring a training set, wherein the training set comprises a first training image, a second training image and a third training image, and the third training image is generated by fusing the first training image with the second training image;

inputting the first training image into the first adversarial neural network and inputting the second training image into the second adversarial neural network, so as to determine a first loss function value of the first adversarial neural network and a first loss function value of the second adversarial neural network respectively;

inputting the third training image into the first adversarial neural network and the second adversarial neural network respectively, so as to determine a second loss function value of the first adversarial neural network and a second loss function value of the second adversarial neural network respectively;

determining a third loss function value according to a comparison result between an acquired fusion image and the third training image, wherein the fusion image is generated by fusing a generated image of the first adversarial neural network with a generated image of the second adversarial neural network; and adjusting a parameter of the image decomposition model by means of back propagation according to at least one of the first loss function value, the second loss function value, or the third loss function value, until a predetermined training end condition is met, wherein the first loss function value is calculated based on a first loss function, the second loss function value is calculated based on a second loss function, and the third loss function value is calculated based on a third loss function; and wherein the first loss function, the second loss function and the third loss function meet a predetermined weight relationship.

2. The method according to claim 1, wherein the inputting the first training image into the first adversarial neural network to determine a first loss function value of the first adversarial neural network comprises:

inputting the first training image into the first generation network of the first adversarial neural network to obtain a first generated image;

inputting the first training image and the first generated image into the first discrimination network of the first adversarial neural network to obtain a first image recognition result; and determining the first loss function value of the first adversarial neural network according to the first image recognition result.

3. The method according to claim 1, wherein the inputting the second training image into the second adversarial neural network to determine a first loss function value of the second adversarial neural network comprises:

inputting the second training image into the second generation network of the second adversarial neural network to obtain a second generated image;

inputting the second training image and the second generated image into the second discrimination network of the second adversarial neural network to obtain a second image recognition result; and determining the first loss function value of the second adversarial neural network according to the second image recognition result.

4. The method according to claim 1, wherein the inputting the third training image into the first adversarial neural network and the second adversarial neural network respectively to determine a second loss function value of the first adversarial neural network and a second loss function value of the second adversarial neural network respectively comprises:

inputting the third training image into the first generation network of the first adversarial neural network to obtain a third generated image;

inputting the third generated image and the first training image associated with the third training image into the first discrimination network of the first adversarial neural network to obtain a third image recognition result;

determining the second loss function value of the first adversarial neural network according to the third image recognition result;

inputting the third training image into the second generation network of the second adversarial neural network to obtain a fourth generated image;

inputting the fourth generated image and the second training image associated with the third training image into the second discrimination network of the second adversarial neural network to obtain a fourth image recognition result; and determining the second loss function value of the second adversarial neural network according to the fourth image recognition result.

5. The method according to claim 4, wherein the determining a third loss function value according to an acquired comparison result between an acquired fusion image and the third training image comprises:

fusing the third generated image with the fourth generated image according to an image fusion algorithm, so as to generate a fusion image;

comparing the fusion image with the third training image to generate a comparison result; and determining the third loss function value according to the comparison result.

6. The method according to claim 1, wherein the second loss function comprises a generator loss function and a discriminator loss function; and wherein the second loss function value comprises a generator loss function value and a discriminator loss function value.

7. The method according to claim 6, wherein the generator loss function in the second loss function has a predetermined weight greater than weights of other loss functions.

8. The method according to claim 1, wherein a training image in the training set is obtained by performing a negative logarithm processing on an X-ray image.

9. The method according to claim 6, wherein the adjusting a parameter of the image decomposition model by means of hack propagation according to the second loss function value comprises:

adjusting a parameter of the first generation network of the first adversarial neural network and a parameter of the second generation network of the second adversarial neural network according to the generator loss function value in the second loss function value; and adjusting a parameter of the first discrimination network or the first adversarial neural network and a parameter of the second discrimination network of the second adversarial neural network according to the discriminator loss function value in the second loss function value.

10. A method of decomposing an image, applicable to a decomposition of an X-ray image, comprising:

performing a negative logarithmic transformation on an acquired X-ray image to generate an image to be decomposed;

processing the image to be decomposed by a first generation network in an image decomposition model, so as to generate a first decomposed image;

processing the image to be decomposed by a second generation network in the image decomposition model, so as to generate a second decomposed image; and performing a negative logarithmic inverse operation transformation on the first decomposed image and the second decomposed image to generate an image decomposition result;

wherein the image decomposition model comprises a first adversarial neural network and a second adversarial neural network, the first adversarial neural network comprises a first generation network and a first discrimination network, and the second adversarial neural network comprises a second generation network and a second discrimination network; and wherein the image decomposition model is obtained according to the method of claim 1.

11. An electronic device, comprising;

one or more processors; and a storage means for storing executable instructions, wherein the executable instructions, when executed by the one or more processors, are configured to implement the method of claim 1.

12. An electronic device, comprising:

one or more processors; and a storage means for storing executable instructions, wherein the executable instructions, when executed by the one or more processors, are configured to implement the method of claim 10.

13. A non-transitory computer-readable storage medium having executable instructions therein, wherein the instructions, when executed by a processor, are configured to implement the method of claim 1.

14. A non-transitory computer-readable storage medium having executable instructions therein, wherein the instructions, when executed by a processor, are configured to implement the method of claim 10.

* * * * *